Patented May 1, 1951

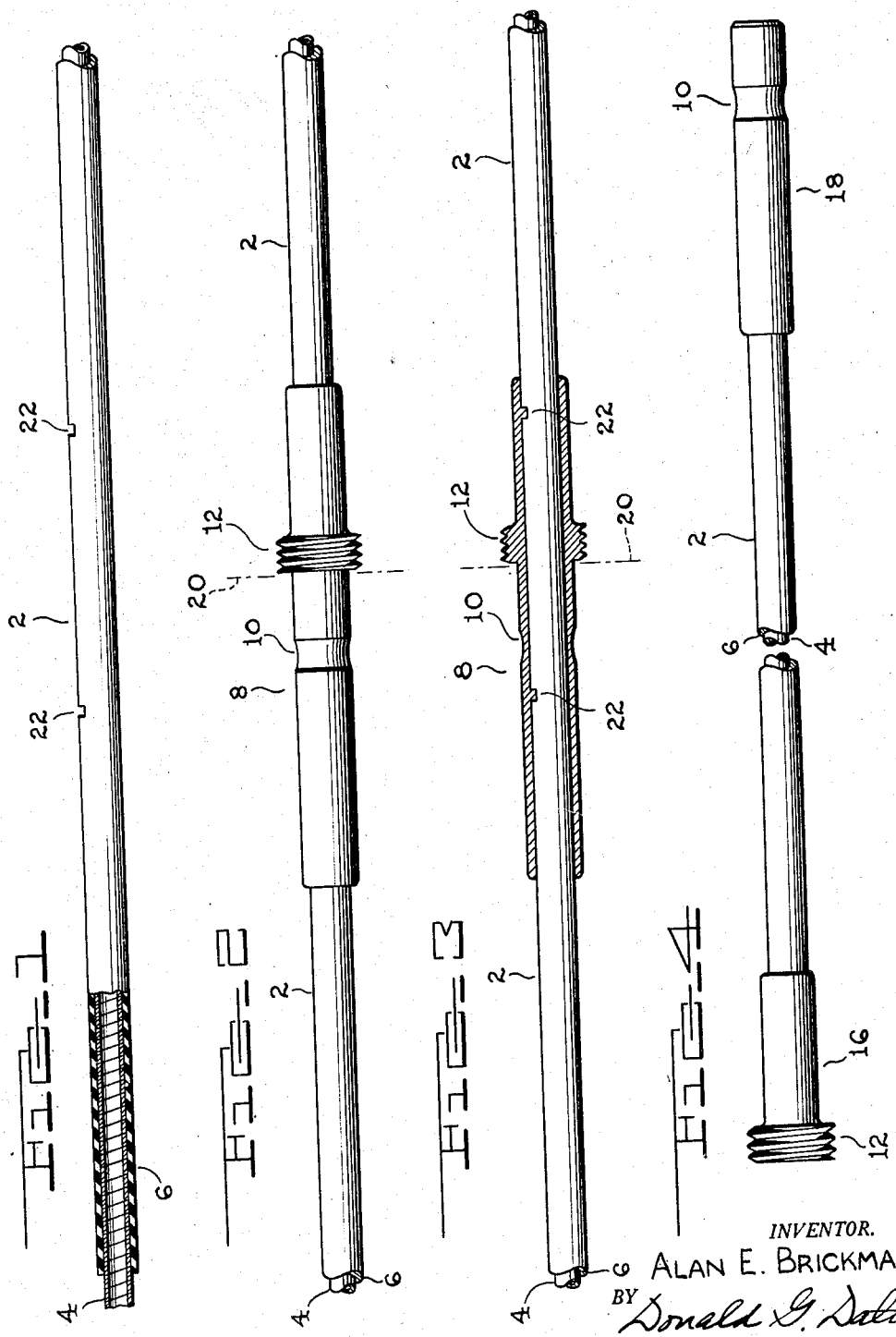

2,550,670

UNITED STATES PATENT OFFICE 2,550,670

FLEXIBLE CONDUIT

Alan E. Brickman, Worcester, Mass., assignor to The American Steel and Wire Company of New Jersey, a corporation of New Jersey Application December 27, 1948, Serial No. 67,490

4 Claims. (Cl. 138—58)

This invention relates to a flexible conduit and more particularly to flexible conduits for brake control cable. Various types of conduits have been provided for this purpose. For example, the patents to Brickman Nos. 2,046,545 and 2,074,770 disclose similar conduits and the patent to Brickman No. 2,092,830 discloses the use of such conduits with brake controls. While such conduits have been satisfactory to a certain extent, it is desirable to increase the life and decrease the cost thereof.

It is therefore an object of my invention to provide such a conduit which is strong and inexpensive.

This and other objects will be more apparent after referring to the following specification and attached drawings, in which:

Figure 1 is a view, partly in section, of a section of the metallic core of the conduit with the rubber jacket thereover;

Figure 2 is a view of the conduit with a fitting cast thereon;

Figure 3 is a view similar to Figure 2, but showing the fitting in section; and

Figure 4 is a view of the completed conduit.

Referring more particularly to the drawings, the reference numeral 2 indicates the flexible conduit of my invention. In making the conduit, a flat hard rolled wire 4 is spirally wound to provide a hollow member through which the brake cable passes. A jacket 6 is then extruded or strip-insulated on said member 4 in the usual manner. This jacket may be made of rubber, neoprene, nylon or other flexible thermoplastic material. A fitting 8 is then die cast over the jacket 6 at spaced intervals. The fitting 8 has a groove 10 and threaded portion 12 on its outer surface. The finished brake conduit, as shown in Figure 4, has a fitting 16 at one end including the threaded portion 12 and a fitting 18 at the other end including the groove 10. The fittings 16 and 18 are obtained by cutting the fittings 8 on line 20. In applying the jacket 6 on the member 4, some of the material of the jacket will pass into but not completely through the convolutions of the member 4, thus providing a good bond therebetween. The corners of the hard rolled wire 4 are ordinarily rounded so that more rubber will flow into the space between the convolutions. In steel flexible conduits, as normally constructed from hard rolled wire, excessive wear takes place at the point where the convolutions are in initial contact. Apparently this wear is due to the friction resulting from aggravated flexing of the conduit member. The rubber which is forced between the convolutions resists this frictional wear, thus increasing the life of the conduit. When the fitting 8 is cast directly on the jacket 6, there is a tendency for the fitting to move under applied forces. This can be prevented by grinding or otherwise removing a part of the jacket to provide a slot 22 which extends down to the core 4. Then, when the fitting 8 is cast, a portion of the metal will unite with the core 4. In some instances the metal will spread beyond the actual dimensions of the slot in contact with the core 4.

In summary, it is seen that the conduit of Figure 4 is preferably fabricated by providing an elongated hollow member constructed of the wire 4 and then applying the jacket 6 thereto. Slots 22 are then cut in the jacket 6 at the desired intervals and the fitting 8 cast around the jacket 6. Finally the fittings 8 are cut along the line 20 to provide the completed conduit.

While the above described method is preferred from the manufacturing standpoint, in some instances it is desirable to provide a greater bond between the fitting and the metallic core. In such a case the fitting of Figure 4 may be manufactured by cutting the conduit to the desired length, stripping the jacket 6 from each end of the conduit an amount less than the length of fittings 16 and 18 and then casting the fittings 16 and 18 over the ends of the conduit. It will be seen that the fittings 16 and 18 will be cast partly on the metallic core 4 and partly on the jacket 6.

While two embodiments of my invention have been shown and described it will be apparent that other adaptations and modifications may be made without departing from the scope of the following claims.

I claim:

1. A flexible conduit comprising a metallic core, a flexible plastic jacket surrounding a portion of said metallic core, and a cast fitting surrounding said flexible jacket, a portion of said fitting extending down to said metallic core and being bonded thereto.

2. A flexible conduit comprising a spirally wound metallic core, a flexible plastic jacket surrounding a portion of said metallic core, and a cast fitting surrounding said flexible jacket, a portion of said fitting extending down to said metallic core and being bonded thereto.

3. A flexible conduit comprising a spirally wound metallic core, a flexible plastic jacket surrounding a portion of said metallic core, and a cast fitting surrounding said flexible jacket at each end thereof, a portion of said fitting extending down to said metallic core and being bonded thereto.

4. A flexible conduit comprising a spirally wound metallic core, a flexible plastic jacket surrounding said metallic core, and a cast fitting surrounding said flexible jacket at each end thereof, said flexible jacket having a slot therein beneath said fitting extending to said metallic core and substantially tangential thereto, a portion of said fitting extending through said slot down to said metallic core and being bonded thereto.

ALAN E. BRICKMAN.

REFERENCES CITED

The following references are of record in the file of this patent:

UNITED STATES PATENTS

| Number | Name | Date |
|---|---|---|
| 701,272 | Neil | May 27, 1902 |
| 867,659 | Hoppes et al. | Oct. 8, 1907 |
| 1,140,425 | Wessoleck | May 25, 1915 |
| 1,812,646 | Burd | June 30, 1931 |
| 2,092,839 | Brickman et al. | Sept. 14, 1937 |
| 2,132,326 | Stone | Oct. 4, 1938 |
| 2,277,786 | Schulthess | Mar. 31, 1942 |
| 2,286,759 | Patnode | June 16, 1942 |
| 2,443,249 | Jackson | June 15, 1948 |